United States Patent
Zhao et al.

(10) Patent No.: US 11,388,680 B2
(45) Date of Patent: Jul. 12, 2022

(54) METHOD, ELECTRONIC DEVICE, MEDIUM, AND APPARATUS FOR SETTING TRANSMIT POWER OF WIRELESS SIGNAL

(71) Applicant: ARRIS Enterprises LLC, Suwanee, GA (US)

(72) Inventors: Penghui Zhao, Shenzhen (CN); Tao Wang, Shenzhen (CN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/324,357

(22) Filed: May 19, 2021

(65) Prior Publication Data
US 2022/0046551 A1 Feb. 10, 2022

(30) Foreign Application Priority Data
Aug. 5, 2020 (CN) .......................... 202010778098.9

(51) Int. Cl.
*H04W 52/24* (2009.01)
*H04W 72/04* (2009.01)
*H04B 17/10* (2015.01)

(52) U.S. Cl.
CPC ........ *H04W 52/242* (2013.01); *H04B 17/103* (2015.01); *H04W 52/241* (2013.01); *H04W 52/243* (2013.01); *H04W 72/0473* (2013.01)

(58) Field of Classification Search
CPC ............. H04W 52/241; H04W 52/242; H04W 52/243; H04W 52/245; H04W 52/367; H04W 72/0473; H04B 17/03
See application file for complete search history.

(56) References Cited

U.S. PATENT DOCUMENTS

| | | | | |
|---|---|---|---|---|
| 2006/0109112 A1* | 5/2006 | Haines | ................... | H04B 1/202 340/8.1 |
| 2010/0091745 A1* | 4/2010 | Bevan | ................... | H04W 24/02 370/338 |
| 2014/0119279 A1* | 5/2014 | Han | ...................... | H04W 48/16 370/328 |
| 2014/0135004 A1* | 5/2014 | Patel | ................... | H04W 52/245 455/452.2 |

(Continued)

*Primary Examiner* — Raymond S Dean
(74) *Attorney, Agent, or Firm* — Wenderoth, Lind & Ponack, L.L.P.

(57) ABSTRACT

The present disclosure relates to a method, electronic device, medium and apparatus for setting transmit power of a wireless signal. A method for setting transmit power of a wireless signal, comprises: receiving, by an electronic device, information indicating a coverage range of the wireless signal and obstacle information within the coverage range of the wireless signal which are inputted via a graphical user interface, wherein the obstacle information at least comprises obstacle material type information indicating a material type of an obstacle to be passed by the wireless signal transmission; determining, by the electronic device, a transmission loss of the wireless signal based on the obstacle information; setting, by the electronic device, transmit power Pt of the wireless signal based on the information indicating the coverage range of the wireless signal and the determined transmission loss of the wireless signal; and causing, by the electronic device, a wireless signal transmitter transmitting the wireless signal with the set transmit power Pt.

20 Claims, 3 Drawing Sheets

(56) References Cited

U.S. PATENT DOCUMENTS

| | | | |
|---|---|---|---|
| 2017/0064595 A1* | 3/2017 | Chang | H04W 48/16 |
| 2019/0383902 A1* | 12/2019 | Yeo | G07D 11/50 |
| 2020/0275517 A1* | 8/2020 | Ashrafi | H04W 92/02 |

* cited by examiner

METHOD, ELECTRONIC DEVICE, MEDIUM, AND APPARATUS FOR SETTING TRANSMIT POWER OF WIRELESS SIGNAL

TECHNICAL FIELD

The present disclosure relates to a method, electronic device, computer readable medium, and apparatus for setting transmit power of a wireless signal.

BACKGROUND

In some usage scenarios of a wireless signal transmitter, it may be needed to set transmit power of the wireless signal transmitter. For example, when setting a Wi-Fi router, it may be needed to set transmit power with which the Wi-Fi router transmits a wireless signal, according to an environment where the Wi-Fi router is located, so that the Wi-Fi router can transmit with an appropriate power, thereby reducing power consumption as much as possible while meeting the coverage range of the Wi-Fi signal.

Conventionally, the transmit power of the wireless signal is set by a percentage, inputted by a user, of the maximum transmit power of the wireless signal transmitter. For example, the maximum transmit power of the wireless signal transmitter is 10 dBm, and conventionally, the transmit power of the wireless signal transmitter is set to 10 dBm*90%, i.e. 9 dBm, by inputting a value of 90 by the user.

However, such an approach of setting the wireless signal transmit power by inputting a percentage value of the maximum transmit power cannot reflect how much coverage the wireless signal can cover by transmitting with the set power under the current wireless signal transmission environment. Thus, such a conventional approach may make it difficult to set an appropriate wireless signal transmit power, resulting in either failure to achieve ideal wireless signal coverage or unnecessary high power consumption.

Therefore, there is a need for a solution that facilitates setting the wireless signal transmit power appropriately.

SUMMARY

The present disclosure proposes a solution for setting an appropriate wireless signal transmit power according to a desired wireless signal coverage range.

According to an aspect of the present disclosure, there is provided a method for setting transmit power of a wireless signal, comprising: receiving, by an electronic device, information indicating a coverage range of the wireless signal and obstacle information within the coverage range of the wireless signal which are input via a graphical user interface, wherein the obstacle information at least comprises obstacle material type information indicating a material type of an obstacle to be passed by the wireless signal transmission; determining, by the electronic device, a transmission loss of the wireless signal based on the obstacle information; setting, by the electronic device, transmit power Pt of the wireless signal based on the information indicating the coverage range of the wireless signal and the determined transmission loss of the wireless signal; and causing, by the electronic device, a wireless signal transmitter transmitting the wireless signal with the set transmit power Pt.

According to an aspect of the present disclosure, there is provided an electronic device for setting transmit power of a wireless signal transmitter, the electronic device comprising a processor and a memory having computer executable instructions stored thereon which, when executed by the processor, cause the processor to: receive information indicating a coverage range of the wireless signal and obstacle information within the coverage range of the wireless signal which are input via a graphical user interface, wherein the obstacle information at least comprises obstacle material type information indicating a material type of an obstacle to be passed by the wireless signal transmission; determine a transmission loss of the wireless signal based on the obstacle information; set transmit power Pt of the wireless signal based on the information indicating the coverage range of the wireless signal and the determined transmission loss of the wireless signal; and causing a wireless signal transmitter transmitting the wireless signal with the set transmit power Pt.

According to an aspect of the present disclosure, there is provided a computer readable medium having computer executable instructions stored thereon which, when executed by a processor, cause the processor to: receive information indicating a coverage range of the wireless signal and obstacle information within the coverage range of the wireless signal which are input via a graphical user interface, wherein the obstacle information at least comprises obstacle material type information indicating a material type of an obstacle to be passed by the wireless signal transmission; determine a transmission loss of the wireless signal based on the obstacle information; set transmit power Pt of the wireless signal based on the information indicating the coverage range of the wireless signal and the determined transmission loss of the wireless signal; and causing a wireless signal transmitter transmitting the wireless signal with the set transmit power Pt.

According to an aspect of the present disclosure, there is provided an apparatus comprising units for performing the method as described above.

BRIEF DESCRIPTION OF THE DRAWINGS

The accompanying drawings, which are incorporated into and constitute a part of the specification, illustrate the embodiments of the present disclosure and, together with the description, serve to explain the principles of the present disclosure.

DETAILED DESCRIPTION

The preferred embodiments of the present disclosure will be described in detail below with reference to the accompanying drawings.

Representative applications of the apparatus and method according to the embodiments described herein are provided in this section. These examples are provided solely to add the context and help understanding of the embodiments. It will thus be obvious to one skilled in the art that the embodiments described in the present disclosure may be practiced without some or all of these specific details. In other instances, well known process steps have not been described in detail in order to avoid unnecessarily obscuring the embodiments described in the present disclosure. Other applications are possible, such that the following examples should not be considered limiting.

Note that like reference numerals and letters refer to like items in the figures, and thus once an item is defined in one figure, it need not be discussed in subsequent figures.

As explained above, the conventional approach of setting the wireless signal transmit power by inputting a percentage value of the maximum transmit power cannot reflect a relationship between the wireless signal transmit power and the wireless signal coverage range, under the current wireless signal transmission environment. Thus, such a conventional approach may make it difficult to set appropriate wireless signal transmit power, resulting in either failure to achieve ideal wireless signal coverage or unnecessary high power consumption.

To overcome these shortcomings in the prior art, the present application proposes a solution that facilitates setting the wireless signal transmit power appropriately. According to the present disclosure, the wireless signal transmit power can be set based on information indicating the wireless signal coverage range and obstacle information, inputted by the user. For example, the user may input a radius of the wireless signal coverage range on a Graphical User Interface (GUI) or draw a circle representing the wireless signal coverage range directly on the GUI, and input information such as building materials that affects the wireless signal transmission loss. The wireless signal transmit power satisfying the user's demands can be calculated and set based on the information inputted by the user. Thus, it is possible to appropriately set the required wireless signal transmit power with the wireless signal coverage range (e.g., via the GUI) under the current transmission environment being visually reflected.

Embodiments of the present disclosure will be described in detail below with reference to the accompanying drawings.

Figure 1:
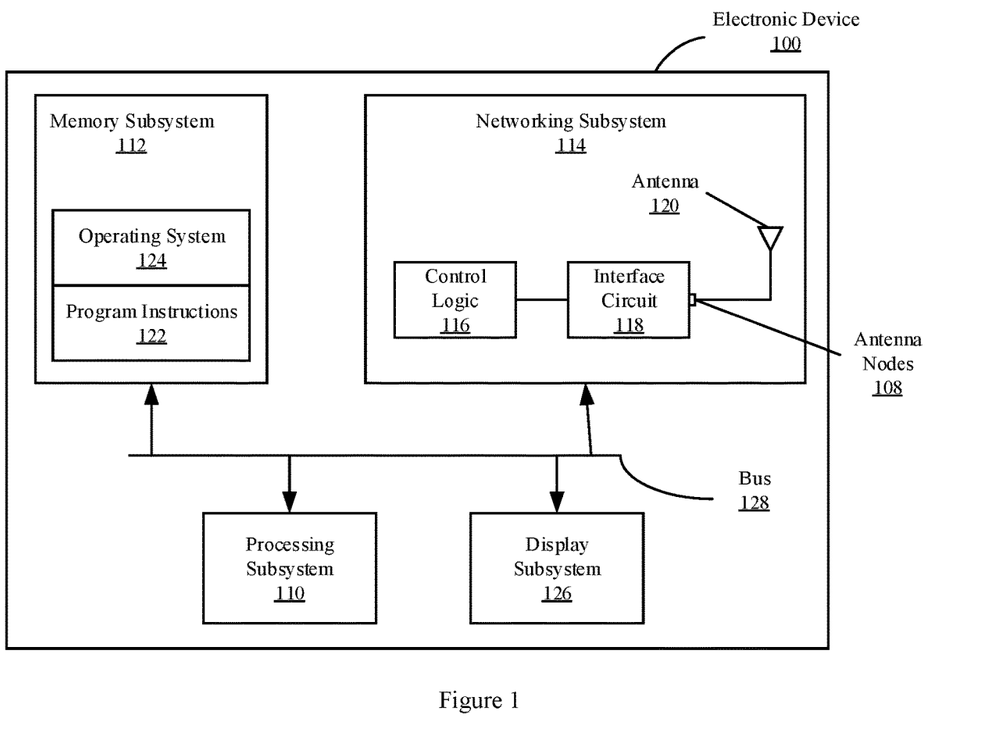
FIG. 1 illustrates an exemplary configuration of an electronic device in which embodiments according to the present disclosure may be implemented.

FIG. 1 illustrates an exemplary configuration of an electronic device in which the embodiments according to the present disclosure may be implemented. Electronic device 100 shown in FIG. 1 may be used to implement the electronic device for setting transmit power of a wireless signal of the present disclosure. Electronic device 100 includes a processing subsystem 110, a memory subsystem 112, and a networking subsystem 114. Processing subsystem 110 includes one or more devices configured to perform computational operations. For example, processing subsystem 110 can include one or more microprocessors, ASICs, microcontrollers, programmable-logic devices, graphical processor units (GPUs) and/or one or more digital signal processors (DSPs).

Memory subsystem 112 includes one or more devices for storing data and/or instructions for processing subsystem 110 and networking subsystem 114. For example, memory subsystem 112 can include dynamic random access memory (DRAM), static random access memory (SRAM), and/or other types of memory (which collectively or individually are sometimes referred to as a 'computer-readable storage medium'). In some embodiments, instructions for processing subsystem 110 in memory subsystem 112 include: one or more program modules or sets of instructions (such as program instructions 122 or operating system 124), which may be executed by processing subsystem 110. Moreover, instructions in the various modules in memory subsystem 112 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 110.

In addition, memory subsystem 112 can include mechanisms for controlling access to the memory. In some embodiments, memory subsystem 112 includes a memory hierarchy that comprises one or more caches coupled to a memory in electronic device 100. In some of these embodiments, one or more of the caches is located in processing subsystem 110.

Networking subsystem 114 includes one or more devices configured to couple to and communicate on a wired and/or wireless network (i.e., to perform network operations), including: control logic 116, an interface circuit 118 and one or more antennas 120 (or antenna elements). (While FIG. 1 includes one or more antennas 120, in some embodiments electronic device 100 includes one or more nodes, such as nodes 508, e.g., a pad, which can be coupled to the one or more antennas 120. Thus, electronic device 100 may or may not include the one or more antennas 120.) For example, networking subsystem 114 can include a Bluetooth networking system, a cellular networking system (e.g., a 3G/4G/5G network such as UMTS, LTE, etc.), a USB networking system, a networking system based on the standards described in IEEE 802.11 (e.g., a Wi-Fi networking system), an Ethernet networking system, and/or another networking system.

In some embodiments, a transmit antenna radiation pattern of electronic device 100 may be adapted or changed using pattern shapers (such as reflectors) in one or more antennas 120 (or antenna elements), which can be independently and selectively electrically coupled to ground to steer the transmit antenna radiation pattern in different directions.

Networking subsystem 114 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 100 may use the mechanisms in networking subsystem 114 for performing simple wireless communication between the electronic devices, e.g., transmitting frames and/or scanning for frames transmitted by other electronic devices.

Within electronic device 100, processing subsystem 110, memory subsystem 112, and networking subsystem 114 are coupled together using bus 128. Bus 128 may include an electrical, optical, and/or electro-optical connection that the subsystems can use to communicate commands and data among one another. Although only one bus 128 is shown for clarity, different embodiments can include a different number or configuration of electrical, optical, and/or electro-optical connections among the subsystems.

In some embodiments, electronic device 100 includes a display subsystem 126 for displaying information on a display, which may include a display driver and the display, such as a liquid-crystal display, a multi-touch touchscreen, etc. Display subsystem 126 can be further configured to display a Graphical User Interface (GUI), such that information can be inputted/outputted via the GUI.

Electronic device 100 can be (or can be included in) any electronic device with at least one network interface. For example, electronic device 100 can be (or can be included in): a desktop computer, a laptop computer, a subnotebook/netbook, a server, a computer, a mainframe computer, a cloud-based computer, a tablet computer, a smartphone, a cellular telephone, a smartwatch, a wearable device, a consumer-electronic device, a portable computing device, an access point, a transceiver, a controller, a radio node, a router, a switch, communication equipment, an access point, test equipment, and/or another electronic device.

Although specific components are used to describe electronic device 100, in alternative embodiments, different components and/or subsystems may be present in electronic device 100. For example, electronic device 100 may include one or more additional processing subsystems, memory subsystems, networking subsystems, and/or display subsystems. Additionally, one or more of the subsystems may not be present in electronic device 100. Moreover, in some embodiments, electronic device 100 may include one or more additional subsystems that are not shown in FIG. 1. Also, although separate subsystems are shown in FIG. 1, in some embodiments some or all of a given subsystem or component can be integrated into one or more of the other subsystems or component(s) in electronic device 100. For example, in some embodiments program instructions 122 are included in operating system 124 and/or control logic 116 is included in interface circuit 118.

Moreover, the circuits and components in electronic device 100 may be implemented using any combination of analog and/or digital circuitry.

An integrated circuit (which is sometimes referred to as a 'communication circuit' or a 'means for communication') may implement some or all of the functionality of networking subsystem 114. The integrated circuit may include hardware and/or software mechanisms that are used for transmitting wireless signals from electronic device 100 and receiving signals at electronic device 100 from other electronic devices. Aside from the mechanisms herein described, radios are generally known in the art and hence are not described in detail. In general, networking subsystem 114 and/or the integrated circuit can include any number of radios. Note that the radios in multiple-radio embodiments function in a similar way to the described single-radio embodiments.

In some embodiments, networking subsystem 114 and/or the integrated circuit include a configuration mechanism (such as one or more hardware and/or software mechanisms) that configures the radio(s) to transmit and/or receive on a given communication channel (e.g., a given carrier frequency).

Hereinafter, the operations of electronic device 100 for setting transmit power of a wireless signal according to the present disclosure will be described with reference to FIG. 1. According to the present disclosure, an instance of electronic device 100 may be an electronic device with a wireless signal transmitter integrated thereon (such as a Wi-Fi router), or may be an electronic device for controlling a wireless signal transmitter, separate from the wireless signal transmitter. The wireless signal transmitter herein represents a device capable of transmitting a wireless signal, but this is not intended to limit the device to only transmit a wireless signal, for example, the device may also be capable of receiving the wireless signal.

In the following description, the solution of the present disclosure will be described by taking Wi-Fi signal and Wi-Fi signal transmitter as an example. However, it should be understood that the solution of the present disclosure is not limited to the Wi-Fi technology, but is applicable to any wireless network technology using any licensed or unlicensed frequency band (such as Citizens Broadband Radio Services (CBRS) frequency band, 2.4 GHz frequency band, 5 GHz frequency band, 6 GHz frequency band or 60 GHz frequency band), including but not limited to Wireless Local Area Network (WLAN) represented by Wi-Fi, Bluetooth, Bluetooth Low Energy, ZigBee, ZigBee pro, RF4CE, Z-Wave, Wireless Personal Network (WPAN), etc.

The memory subsystem 112 is for example configured to store instructions to be executed by the processor (s) of the processing subsystem and/or other subsystem(s) of electronic device 100 and predetermined information. The predetermined information may include some predetermined information of the wireless signal transmission system and correspondence information between the material types of the obstacle and the wireless signal transmission losses. The predetermined information of the wireless signal transmission system may include, for example, Received Signal Strength RSS (which may be, for example, a value of a predetermined minimum RSS that the wireless signal receiving device can transceive data) and system parameters of the wireless signal transmission system. For example, the system parameters of the wireless signal transmission system can comprise one or more of an antenna gain Gr value of the wireless signal receiving device, an antenna gain Gt value of the wireless signal transmitter, cable and head loss Lc value, the frequency of transmit signal currently adopted by the wireless signal transmitter, the country code of the wireless signal transmitter and the part of frequency band/channel currently adopted by the wireless signal transmitter. The correspondence information between the material types of the obstacle and the wireless signal transmission losses may be, for example, a predetermined table describing the correspondence between the material types of the obstacle and the wireless signal transmission losses. The above-mentioned predetermined information may be stored in memory subsystem 112 at the time of initializing electronic device 100, or may be updated during configuration/update.

Processing subsystem 110 is configured to control to receive input information and transmit output information via networking subsystem 114 and/or display subsystem 126 (especially the GUI of display subsystem 126). The input information may be, for example, information indicating a wireless signal coverage range and obstacle information within the wireless signal coverage range, inputted by a user. For example, processing subsystem 100 may control to receive the information inputted by the user via a GUI displayed by display subsystem 126 or a GUI displayed by another electronic device (e.g. a wireless signal receiving device) remotely connected with electronic device 100. The information indicating the wireless signal coverage range may be, for example, a transmission distance of the wireless signal in the form of a value (i.e., a radius of the wireless signal coverage range), or may be a circle having a specific size. In the latter case, processing subsystem 110 may calculate a corresponding actual transmission distance of the wireless signal based on the size of the received circle. The obstacle information for example may include at least obstacle material type information indicating a material type of an obstacle to be passed by the wireless signal transmission, and further, may also include a number of obstacles of each material type in each of one or more directions in which the wireless signal is to be transmitted. For example, the electronic device 100 may receive a material type name of an obstacle or an indicator or list option corresponding to the material type of the obstacle inputted by the user, as the obstacle material type information indicating the material type of the obstacle to be passed by the wireless signal transmission. The input information may also include other information required to set the wireless signal transmitter. For example, the input information may include information indicating a transmit frequency to be used by the wireless signal transmitter (such as information indicating whether 2.4 GHz, 5 GHz, 6 GHz or 60 GHz is to be used).

The output information may be display information related to the wireless signal coverage range corresponding to the wireless signal transmit power to be set for presenting to the user on the GUI. For example, the output information may be information to be displayed on the GUI indicating a circle of the wireless signal coverage range (e.g., the information may include graphical information indicating a circle having a particular radius and numerical information indicating the magnitude of the particular radius). For another example, the output information may be information indicating a scale of the current graph, and the scale may assist the user in understanding the position relationship between multiple wireless signal transmitters in the wireless signal transmission environment and the corresponding wireless signal coverage ranges. For another example, the output information may be information guiding the operations of the user as described in detail hereinafter.

The processing subsystem 110 may be configured to calculate and set the transmit power of the wireless signal based on the information received via networking subsystem 114 and/or display subsystem 126 and the information stored in the memory subsystem.

In accordance with the present disclosure, processing subsystem 110 may be configured to determine the wireless signal transmission loss based on the received obstacle information within the coverage range of the wireless signal. For example, the wireless signal transmission loss may be determined based on the obstacle material type information indicating a material type of the obstacle to be passed by the wireless signal transmission inputted by the user via the GUI, and the correspondence between the material types of the obstacle and the wireless signal transmission losses stored in memory subsystem 112. Specifically, the processing subsystem 110 may look up a corresponding wireless signal transmission loss from the correspondence table between the material types of the obstacle and the wireless signal transmission losses, according to the information indicating the material type of the obstacle (such as a name, an indicator, a list option, and the like of the material type of the obstacle) inputted by the user. Table 1 shows an example of the correspondence table between the material types of the obstacle and the Wi-Fi signal transmission losses. For example, the user may input/select the cubicle wall from the list of selectable materials on the graphical interface as the obstacle material type information, and processing subsystem 110 may determine that the Wi-Fi signal transmission loss is 5 dB, based on the input information and the Wi-Fi signal transmission frequency, e.g., 5 GHz (e.g., set by the user or autonomously set by electronic device 100/the Wi-Fi signal transmitter).

TABLE 1

|  | 2.4 GHz | 5 GHz |
| --- | --- | --- |
| Interior drywall | 3 dB | 4 dB |
| Cubicle wall | 2 dB | 5 dB |
| Wood door (Hollow-Solid) | 3-4 dB | 6-7 dB |
| Brick/Concrete wall | 10 dB | 15 dB |
| Glass/Window (not tinted) | 2 dB | 6 dB |
| Double-pane coated glass | 13 dB | 20 dB |
| Steel/Fire exit door | 13 dB | 25 dB |

Table 1 is merely an example of the correspondence table between the material types of the obstacle and the Wi-Fi signal transmission losses. In fact, a specific value of the Wi-Fi signal transmission loss corresponding to the material type of the obstacle may vary depending on actual circumstances of the obstacle. For example, brick/concrete walls may have a transmission loss within 6-18 dB and 10-30 dB respectively at 2.4 GHz and 5 GHz. Respective correspondence tables can be stored according to specific conditions when the wireless signal transmitter is initialized, and in addition, the correspondence table can also be updated by a technical administrator or a user himself according to the specific conditions.

In some cases, the transmission environment of the wireless signal may be complex including multiple obstacles, and the wireless signal transmission may pass a plurality of obstacles. In such cases, the user may not know the wireless signal transmission loss in which direction in the current environment is the largest, such that it is difficult for the user to determine what kind of obstacle information to input. In view of this, electronic device 100 may also be configured to receive more detailed obstacle information.

For example, electronic device 100 may receive, via the GUI of display subsystem 126 or via the GUI remotely connected with electronic device 100 by the networking subsystem, the material type(s) of the obstacle(s) in each of the one or more directions in which the wireless signal is to be transmitted and the number of obstacles for each material type. For example, electronic device 100 may guide the user through the GUI to input/select the material type(s) of the obstacle(s) in east, west, south, and north directions and the number of obstacles for each material type. Here, the four directions of "east", "west", "south", "north" are just one example implementation, and electronic device 100 may also receive the obstacle information corresponding to any one or more directions defined by the user himself, as long as the obstacle information indicates the material type(s) of the obstacle(s) in each direction and the corresponding number of obstacles. In this case, processing subsystem 110 may be configured to determine the wireless signal transmission loss corresponding to each material type of the obstacle according to the correspondence between the material types of the obstacles and the wireless signal transmission losses; calculate a sum of products of the wireless signal transmission loss corresponding to each material type of the obstacle in each direction and the number of the corresponding obstacles in the direction as the wireless signal transmission loss in the direction; and determine a maximum value of the one or more wireless signal transmission losses corresponding to the one or more directions as the wireless signal transmission loss. For example, assuming that electronic device 100 receives the following obstacle information:

TABLE 2

| Direction | Material type and number of obstacles |
| --- | --- |
| First direction | Interior drywall: 1; Cubicle wall: 2 |
| Second direction | Hollow wood door: 1; Glass/window (not tinted): 1 |
| Third direction | Hollow wood door: 2; Cubicle wall: 1; |
| Fourth direction | Interior drywall: 1 | then, first, processing subsystem 110 may determine, according to the above-mentioned obstacle information and Table 1 stored in memory subsystem 112, the Wi-Fi signal transmission loss corresponding to each material type involved in the obstacle information, that is, determine (for example, at a transmit frequency of 5 GHz) the Wi-Fi signal transmission loss of the Interior drywall to be 4 dB, the transmission loss of the Cubicle wall to be 5 dB, the transmission loss of the hollow wood door to be 6 dB, and the transmission loss of the glass/window (not tinted) to be 6 dB. Subsequently, processing subsystem 110 can calculate the Wi-Fi signal transmission loss corresponding to each direction by multiplying each Wi-Fi signal transmission loss by the corresponding number of obstacles and calculating a sum of the Wi-Fi signal transmission losses for different obstacles in each direction. That is, in this example, the transmission loss in the first direction is calculated to be 4*1+5*2=14 (dB); the transmission loss in the second direction is 6*1+6*1=12 (dB); the transmission loss in the third direction is 6*2+5*1=17 (dB); the transmission loss in the fourth direction is 4*1=4 (dB). Next, processing subsystem 110 may determine the maximum value 17 dB among the Wi-Fi signal transmission losses in the four directions as the Wi-Fi signal transmission loss to be used for calculating the Wi-Fi signal transmit power.

Note that the above example taking four directions is only illustrative. The user can input obstacle information regarding any number of directions according to actual conditions and/or needs. For example, the material type(s) and number of multiple obstacles in one direction can be input.

In the case where the user is not able to determine which is the worst transmission direction (i.e. the direction with the largest transmission loss) in the current wireless signal transmission environment causing being unable to determine to input obstacle information corresponding to which single direction, by inputting the information indicating the material type(s) and the number of the obstacle(s) in a plurality of directions, advantageously, it is possible to make electronic device 100 to evaluate the wireless signal transmission loss in the current wireless signal transmission environment in a more accurate manner. Also, by determining the maximum value among the wireless signal transmission losses in a plurality of directions as the transmission loss to be used for calculating the transmit power, a wireless signal coverage range desired by the user can be effectively obtained. Thus, even if the user does not have the ability to evaluate the transmission effect in various directions of the wireless transmission environment, by inputting the obstacle information corresponding to multiple directions, the most appropriate wireless signal coverage range can be set.

According to the present disclosure, processing subsystem 110 may be configured to set the transmit power of the wireless signal based on the received information indicating the coverage range of the wireless signal and the determined transmission loss of the wireless signal. Particularly, a transmission distance of the wireless signal may be determined based on the received information indicating the coverage range of the wireless signal, and the transmit power of the wireless signal may be set based on the transmission distance of the wireless signal, Received Signal Strength RSS, system parameters of the wireless signal transmission system, and the determined wireless signal transmission loss.

According to the present disclosure, the received signal strength RSS may be a predetermined minimum RSS at which the wireless signal receiving device (e.g., terminal device) is capable of transceiving data. The minimum RSS may be stored in memory subsystem 112 as a predetermined value (e.g. when initializing the electronic device), and is followed by different wireless signal transmission environments and wireless signal transceivers. In the case of Wi-Fi, the minimum RSS is a signal strength that can be predetermined based on a minimum coding rate requirement of the Wi-Fi signal, and its typical value is, for example, −82 dB. The system parameters of the wireless signal transmission system may include an antenna gain Gr of the wireless signal receiving device, an antenna gain Gt of the wireless signal transmitter, cable and head loss Lc, and the transmit frequency of the wireless signal. The antenna gain of the wireless signal receiving device/wireless signal transmitter is an inherent design value of the antenna, and for a typical Wi-Fi signal transceiving antenna, typical values for the antenna gain Gr of the Wi-Fi signal receiving device and the antenna gain Gt of the Wi-Fi signal transmitter are 5 dB-10 dB, for example. The cable and head losses Lc is, for example, an inherent value of the wireless signal transceiving system, and is typically small and thus negligible. As described above with reference to memory subsystem 112, RSS, Gr, Gt, and Lc may all be stored in memory subsystem 112 in advance, and may be updated by a configuration/update process. The transmit frequency of the wireless signal may be set by the user or autonomously set by electronic device 100 or the wireless signal transmitter itself. Memory subsystem 112 may store the frequency used by the wireless signal transmitter.

Processing subsystem 110 may calculate the free space loss Lbf based on the information indicating the wireless signal coverage range, and calculate the transmit power based on Lbf. Specifically, the free space loss Lbf may be calculated according to the information indicating the wireless signal coverage range (e.g., a transmission distance value of the wireless signal representing a radius of the wireless signal coverage range, or a circle having a particular size) and the wireless signal transmit frequency received by electronic device 100 or autonomously set by electronic device 100/the wireless signal transmitter (e.g., dynamically selected according to actual conditions). For example, processing subsystem 110 may calculate Lbf (dB) according to the following equation:

$$Lbf = 10\log_{10}\left(\left(\frac{4\pi DF}{c}\right)^2\right) \quad \text{(Equation 1)}$$

where F is a frequency of the wireless signal, D is a transmission distance of the wireless signal, and c is a velocity of light. In case where the unit of the frequency F is MHz and the unit of the distance D is m, Equation 1 can be simplified as:

$$Lbf = 20lgF + 20LgD - 27.55 \quad \text{(Equation 2)}$$

In particular, in case where the information received via the GUI is a circle having a particular size, processing subsystem 110 may calculate the corresponding actual transmission distance D of the wireless signal according to a predetermined proportional relationship based on the size of the circle received on the GUI, in order to further calculate the free space loss.

According to the present disclosure, the processing subsystem 110 may calculate the first transmit power $Pt_1$ according to the following equation:

$$Pt_1 = RSS - Gr - Gt + Lc + Lbf \quad \text{(Equation 3)}$$

According to the present disclosure, the first transmit power $Pt_1$ is the ideal transmit power to achieve the desired wireless signal coverage range without the consideration of the wireless signal transmission loss caused by an obstacle in the wireless signal transmission environment. Processing subsystem 110 may correct the first transmit power $Pt_1$ based on the determined transmission loss in the current wireless signal transmission environment so as to calculate the transmit power Pt to be set. For example, the processing subsystem may add the determined wireless signal transmission loss to the first transmit power $Pt_1$ to correct the first transmit power $Pt_1$, that is, the first transmit power $Pt_1$ may be corrected according to the following equation:

$$Pt = Pt_1 + X \quad \text{(Equation 4)}$$

where Pt is the wireless signal transmit power to be set, and X is the determined wireless signal transmission loss.

Further, Pt may be corrected according to minimum and maximum values of the transmit power that can be set for the wireless signal transmitter. For example, processing subsystem 110 may be configured to acquire the country code of the wireless signal transmitter and the part of frequency band/channel to be used for the current transmission from the memory subsystem. For example, a table including minimum and maximum values of the transmit power corresponding to country codes and parts of frequency band/channels for transmission may be stored in the memory subsystem 112. Thus, processing subsystem 110 may search through the table using the acquired country code and part of frequency band/channel to acquire the minimum and maximum values allowed to be set for the transmit power corresponding to the country code and the part of frequency band/channel.

For example, after Pt being calculated according to Equation 4, if the calculated Pt is less than the minimum transmit power that can be set for the wireless signal transmitter, Pt is corrected to be the minimum transmit power, and if the calculated Pt is greater than the maximum transmit power that can be set for the wireless signal transmitter, Pt is corrected to be the maximum transmit power.

Continuing with the above example, for example, assuming that electronic device 100 has received the information shown in Table 2 and has received information indicating that the transmission distance D of the wireless signal is 300 m, and assuming that for the current wireless signal transmission system, RSS is −82 dB, Gr and Gt are both 6 dB, and Lc is negligible, processing subsystem 110 may substitute the values of the respective parameters into the above Equations 2-4 to perform the following calculations: Lbf=20lg1000+20Lg300−27.55=96.05 (dB); $Pt_1$=−82−6−6+0+96.05=2.05 (dBm); Pt=2.05+17=19.05 (dBm), thus the transmit power of the wireless signal to be set is finally determined as 19.05 dBm (In this example, 19.05 dBm falls between the minimum and maximum values of the transmit power that can be set for the wireless signal transmitter, so this value is not further corrected).

Processing subsystem 110 may set the corrected transmit power Pt as the final transmit power of the wireless signal. For example, in case where electronic device 100 itself is integrated with the wireless signal transmitter, processing subsystem 110 may control the wireless signal transmitter of electronic device 100 to transmit a wireless signal at the transmit power Pt. In case where electronic device 100 is a control device of the wireless signal transmitter, processing subsystem 110 may control to send an instruction for setting the wireless signal transmit power to the wireless signal transmitter through networking subsystem 114, to instruct the wireless signal transmitter to transmit at the transmit power Pt.

Note that, since the maximum value and the minimum value of the transmission power that can be set for the wireless signal transmitter may as the part of frequency band/channel to be used changes, there may be a case where the part of frequency band/channel for transmission read from the memory subsystem at the time of setting the transmission power is different from the part of frequency band/channel used at the time of actual transmission, resulting in that the maximum/minimum transmission power that can be set for the wireless signal transmitter at the time of actual transmission may dynamically change as the part of frequency band/channel to be used dynamically changes. For example, for Wi-Fi signal transmission, there are cases where Dynamic Frequency Selection (DFS) is applied. According to the specification of DFS, a Wi-Fi transmitter may perform transmission using a non-Wi-Fi dedicated frequency band if the band is unoccupied. And, the transmit power allowed for performing transmission using the non-Wi-Fi dedicated frequency band may be lower or higher than the transmit power allowed for performing transmission using the Wi-Fi dedicated frequency band. Therefore, according to an embodiment of the present disclosure, each time after the part of frequency band/channel for wireless signal transmission being changed, the part of frequency band/channel to be used for transmission is read again, and the currently allowed maximum value and minimum value of the transmission power are obtained according to the read part of frequency band/channel. Then, the previously set transmission power Pt is re-corrected according to the above-explained manner before performing the next transmission.

According to the present disclosure, multiple wireless signal transmitters may be involved in the wireless signal transmission environment. This case, for example may refer to a plurality of mesh routers connected by means of mesh networking. In this case, it is considered to set respective transmit power for the multiple wireless signal transmitters via electronic device 100 associated with a master wireless signal transmitter, wherein, the respective transmit power of the multiple wireless signal transmitters may be the same or different. For example, electronic device 100 associated with the master wireless signal transmitter may determine the transmit power Pt with respect to the master wireless signal transmitter, and may control to set the transmit power of all wireless signal transmitters to be the transmit power Pt determined for the master wireless signal transmitter via the communication among the wireless signal transmitters, such that advantageously, the setting process of the transmission power of the multiple wireless signal transmitters can be relatively simple and convenient. For another example, electronic device 100 associated with the master wireless signal transmitter may receive the information indicating the coverage range of the wireless signal and the obstacle information within the wireless signal coverage for each of the multiple wireless signal transmitters via the GUI, set a respective transmit power for each wireless signal transmitter based on the received information, and cause each wireless signal transmitter to transmit with its own transmit power via communication among the wireless signal transmitters. Thereby, advantageously, appropriate signal coverage can be set for each wireless signal transmitter for the current wireless signal transmission environment.

Figure 2:
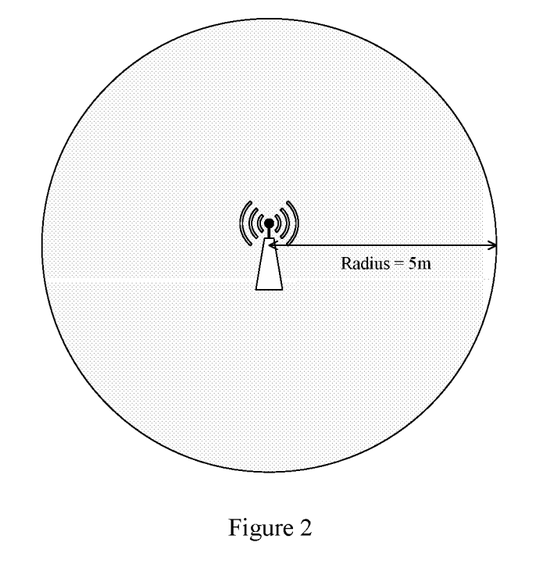
FIG. 2 is a schematic diagram indicating a coverage range of the wireless signal according to an embodiment of the present disclosure.

According to the present disclosure, processing subsystem 110 may further control to display an interactive interface with the user by a GUI of the display subsystem of electronic device 100 itself or a GUI of another electronic device remotely connected via the networking subsystem 114. Processing subsystem 110 may control to display, on the GUI, a circle representing the wireless signal coverage range with a center of the circle being the wireless signal transmitter, and its radius, as shown in FIG. 2, so that the user may adjust the desired wireless signal coverage range by changing the size of the circle. For example, control may be performed such that the size of the circle representing the wireless signal coverage range may be changed according to the user's input within a range of the radius corresponding to the maximum and minimum values of the transmit power supported by the wireless signal transmitter.

Figure 3:
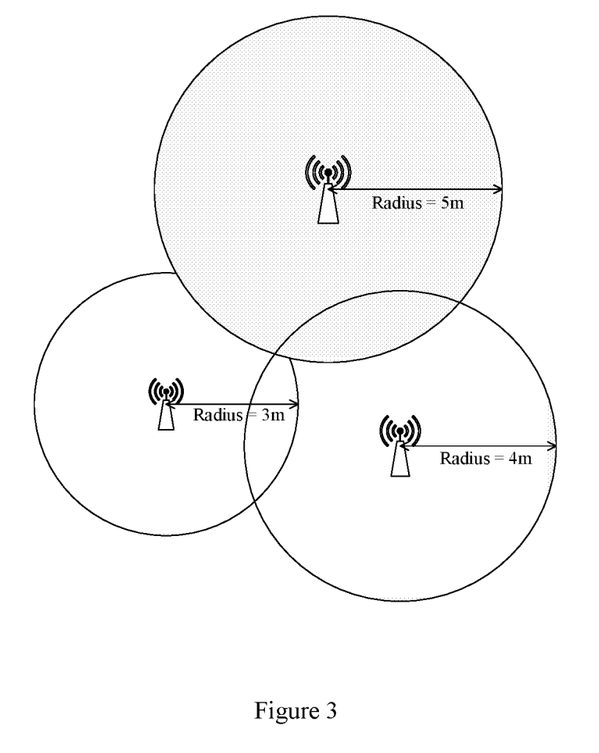
FIG. 3 is a schematic diagram indicating a coverage range of the wireless signal in the case where there are multiple wireless signal transmitters, according to an embodiment of the present disclosure.

In the case where there are multiple wireless signal transmitters (for example, in the case of the mesh routers described above), the processing subsystem may also control, so that the user can set position relations of the multiple wireless signal transmitters involved in the wireless signal transmission environment and/or respective wireless signal coverage range and obstacle information of the multiple wireless signal transmitters through the GUI and display the wireless signal coverage range of each wireless signal transmitter. FIG. 3 shows a GUI display example in the case where there are multiple wireless signal transmitters. For example, processing subsystem 110 may control such that the user can arrange each wireless signal transmitter on the GUI according to an actual position relation (e.g., by dragging and placing each wireless signal transmitter on the GUI). The processing subsystem 110 may control to display auxiliary information such as appropriate scale, grid lines, etc. on the GUI to assist the user in correctly arranging each wireless signal transmitter. Furthermore, processing subsystem 110 of electronic device 100 associated with the mater wireless transmitter may also control such that the user can set coverage range and obstacle information of each wireless signal transmitter on the GUI, thereby the respective transmit power for each wireless signal transmitter can be set with the received information.

Processing subsystem 110 may control to simultaneously display on the GUI the wireless signal coverage range of each wireless signal transmitter, the user can visually know the wireless signal coverage condition in the whole wireless signal transmission environment, so that information indicating the wireless signal coverage range of each wireless signal transmitter can be easily and reasonably inputted, and thus advantageously, the most reasonable wireless signal transmit power can be set to avoid incapability of realizing the expected wireless signal coverage or wasteful use of the transmit power.

Processing subsystem 110 may also control to display some information assisting the user in operations on the GUI, such as a list of material types of the obstacles, so that the user can input the information by a selection operation on the GUI. In addition, processing subsystem 110 may also control to output some information guiding the user operation, for example, control to output a prompt message indicating: if you do not know the worst direction of wireless signal transmission in the current wireless transmission environment, you may input the material type(s) and number of obstacles in multiple directions in the check box.

The structural configuration and operations of each subsystem of electronic device 100 for setting the transmit power of the wireless signal according to the present disclosure has been described above in detail. Next, a flowchart 400 of a method for setting transmit power of a wireless signal according to an embodiment of the present disclosure will be explained with reference to FIG. 4. The method may be implemented, for example, by electronic device 100 described above.

Figure 4:
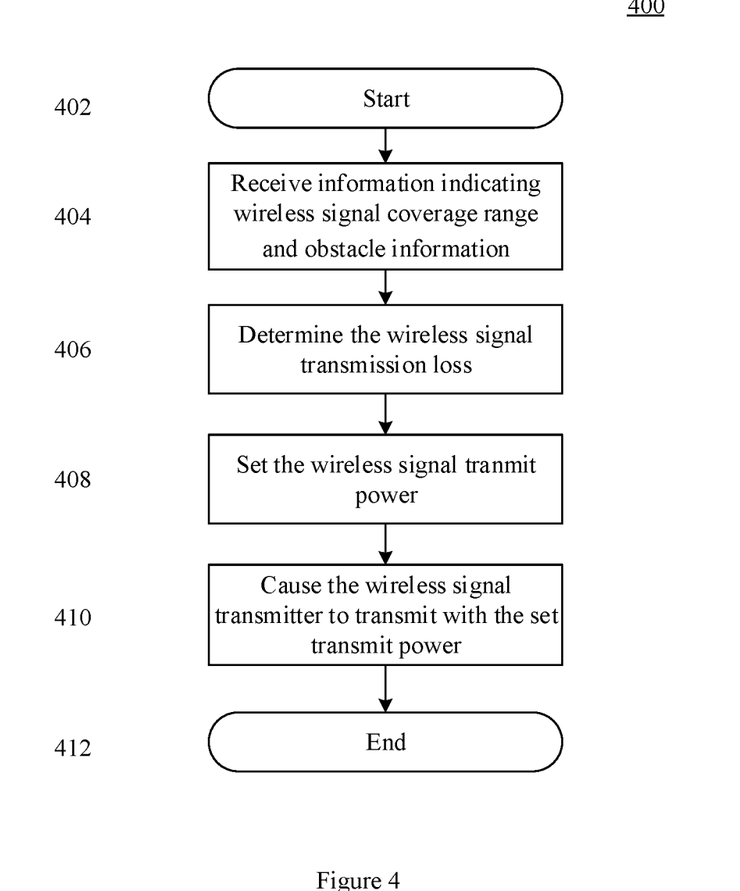
FIG. 4 is a flow chart illustrating a method for setting transmit power of a wireless signal according to an embodiment of the present disclosure.

As shown in FIG. 4, the operational flow 400 starts at a step 402. Subsequently, information indicating a coverage range of a wireless signal and obstacle information within the coverage range of the wireless signal input via a GUI are received by electronic device 100 at a step 404. A transmission distance of the wireless signal may be received as the information indicating the coverage range of the wireless signal, and the obstacle information may include at least a material type of an obstacle to be passed by the wireless signal transmission. As described above, the GUI can be set in display subsystem 126 of electronic device 100 or can be remotely connected via networking subsystem 114 of electronic device 100.

Next, at a step 406, electronic device 100 determines the wireless signal transmission loss based on the obstacle information. As described above, the wireless signal transmission loss corresponding to the material type indicated by the obstacle material type information may be determined according to a predetermined correspondence between the material types of the obstacle and the wireless signal transmission losses. As described above, a maximum wireless signal transmission loss in a plurality of directions may further be determined as the wireless signal transmission loss based on the wireless signal transmission loss corresponding to each material type of the obstacle in each direction and the number of corresponding obstacles in the direction.

Next, at a step 408, the transmit power Pt of the wireless signal can be set based on the information indicating the coverage range of the wireless signal and the determined wireless signal transmission loss.

Subsequently, at a step 410, the electronic device 110 causes a wireless signal transmitter to transmit the wireless signal with the set transmit power Pt.

Finally, the process flow ends at 412.

It is noted that the above-described operational flow 400 is merely illustrative and that a person skilled in the art may modify the operational flow according to actual situations. The order of the various steps may be adjusted or performed in parallel accordingly. Additionally, the operational flow 400 may include some additional steps, e.g., controlling the display of the wireless signal coverage (e.g., in the form of a circle) and/or a list of material types of the obstacles via the GUI prior to the step 404, to assist the user in setting the wireless signal coverage range information and/or selecting a material type of the obstacle. Further, in the case where there are multiple wireless signal transmitters, it is also possible, prior to the step 404, to receive information regarding the position relation of the multiple wireless signal transmitters through the GUI and display information indicating the wireless signal coverage range of each wireless signal transmitter through the GUI.

The electronic device and the method for setting transmit power of a wireless signal according to the embodiments of the present disclosure have been described above with reference to the accompanying drawings. The solution of the present disclosure may be suitable for any indoor or outdoor wireless signal transmission environment.

According to the present disclosure, the transmit power of the wireless signal can be set reasonably based on the required wireless signal coverage range, in consideration of obstacles in the wireless device transmission environment. Further, according to the present disclosure, the wireless signal coverage range may be visually displayed via the GUI, so as to assist the user to intuitively set a reasonable wireless signal coverage range, thereby appropriately setting the wireless signal transmit power.

The present disclosure may be implemented as any combination of an apparatus, a system, an integrated circuit, and a computer program on a non-transitory computer readable recording medium. The one or more processors may be implemented as an integrated circuit (IC), an application specific integrated circuit (ASIC), or large scale integrated circuit (LSI), system LSI, super LSI, or ultra LSI components that perform a part or all of the functions described in the present disclosure.

The present disclosure includes the use of software, applications, computer programs, or algorithms. The software, applications, computer programs, or algorithms can be stored on a non-transitory computer-readable medium for causing a computer, such as the one or more processors, to execute the steps described above and in the drawings. For example, the one or more memories stores software or algorithms with executable instructions and the one or more processors can execute a set of instructions of the software or algorithms in association for providing monitoring and installation enhancements in any number of wireless networks in accordance with the embodiments described in the present disclosure.

The software and computer programs, which can also be referred to as programs, software applications, applications, components, or code, include machine instructions for a programmable processor, and can be implemented in a high-level procedural language, an object-oriented programming language, a functional programming language, a logical programming language, or an assembly language or a machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Aspects of the present disclosure are described above with Wi-Fi technology as a representative example of the wireless network technology. However, the description of Wi-Fi technology as an example is merely illustrative but not restrictive, and it should not be understood that aspects of the present disclosure can only be used to set the transmit power of Wi-Fi signals. Indeed, the solution of the present disclosure may be used to set the transmit power of any wireless signal.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

Similarly, while operations are depicted in the drawings in a particular order, this should not be understood as requiring that such operations be performed in the particular order shown or in sequential order, or that all illustrated operations be performed, to achieve desirable results. In some cases, multitasking and parallel processing may be advantageous.

What we claim is:

1. A method for setting transmit power of a wireless signal, comprising:
    receiving, by an electronic device, information indicating a coverage range of the wireless signal and obstacle information within the coverage range of the wireless signal which are inputted via a graphical user interface, wherein the obstacle information at least comprises obstacle material type information indicating a material type of an obstacle to be passed by the wireless signal transmission;
    determining, by the electronic device, a transmission loss of the wireless signal based on the obstacle information;
    setting, by the electronic device, transmit power Pt of the wireless signal based on the information indicating the coverage range of the wireless signal and the determined transmission loss of the wireless signal; and
    causing, by the electronic device, a wireless signal transmitter transmitting the wireless signal with the set transmit power Pt.

2. The method according to claim 1, wherein
    determining the transmission loss of the wireless signal based on the obstacle information comprising: determining the transmission loss of the wireless signal corresponding to the material type indicated by the obstacle material type information, according to a predetermined correspondence between material types of the obstacle and transmission losses of the wireless signal.

3. The method according to claim 1, wherein
the obstacle information further comprises a number of obstacles of each material type in each of one or more directions in which the wireless signal is to be transmitted,
wherein determining the transmission loss of the wireless signal based on the obstacle information comprising:
determining the transmission loss of the wireless signal corresponding to each material type of obstacles indicated by the obstacle material type information, according to a predetermined correspondence between the material types of the obstacle and the transmission losses of the wireless signal;
calculating a sum of products of the transmission loss of the wireless signal corresponding to each material type of the obstacles in each direction and the number of the corresponding obstacles in the direction as the transmission loss of the wireless signal in the direction; and
determining a maximum value of the one or more transmission losses of the wireless signal corresponding to the one or more directions as the transmission loss of the wireless signal.

4. The method according to claim 1, wherein the method further comprising displaying, via the graphical user interface, the coverage range of the wireless signal.

5. The method according to claim 1, wherein
in the case where there are multiple wireless signal transmitters, determining respective transmit power for the multiple wireless signal transmitters via the electronic device associated with a master wireless signal transmitter, wherein the respective transmit power of the multiple wireless signal transmitter is the same or different.

6. The method according to claim 5, wherein the method further comprises: receiving information indicating a position relation of the multiple wireless signal transmitters which is inputted via a graphical user interface, and displaying, via a graphical user interface, the coverage range of the wireless signal of each wireless signal transmitter.

7. The method of claim 1, wherein
a transmission distance of the wireless signal is received as the information indicating the coverage range of the wireless signal, wherein the transmission distance is a radius of the coverage range of the wireless signal.

8. The method of claim 1, wherein
the method further comprising correcting the transmit power Pt according to minimum and maximum values of the transmit power that can be set for the wireless signal transmitter.

9. The method according to claim 1, wherein setting the transmit power Pt of the wireless signal based on the information indicating the coverage range of the wireless signal and the determined transmission loss of the wireless signal comprising:
determining a transmission distance of the wireless signal based on the information indicating the coverage range of the wireless signal; and
setting the transmit power Pt based on the transmission distance of the wireless signal, system parameters of a wireless transmission system, Received Signal Strength (RSS) and the determined transmission loss of the wireless signal.

10. An electronic device for setting transmit power of a wireless signal, the electronic device comprising a processor and a memory having computer executable instructions stored thereon which, when executed by the processor, cause the processor to:
receive information indicating a coverage range of the wireless signal and obstacle information within the coverage range of the wireless signal which are inputted via a graphical user interface, wherein the obstacle information at least comprises obstacle material type information indicating a material type of an obstacle to be passed by the wireless signal transmission;
determine a transmission loss of the wireless signal based on the obstacle information;
set transmit power Pt of the wireless signal based on the information indicating the coverage range of the wireless signal and the determined transmission loss of the wireless signal; and
causing a wireless signal transmitter transmitting the wireless signal with the set transmit power Pt.

11. The electronic device according to claim 10, wherein determining the transmission loss of the wireless signal based on the obstacle information comprising: determining the transmission loss of the wireless signal corresponding to the material type indicated by the obstacle material type information, according to a predetermined correspondence between the material types of the obstacle and the transmission losses of the wireless signal.

12. The electronic device according to claim 10, wherein
the obstacle information further comprises a number of obstacles of each material type in each of one or more directions in which the wireless signal is to be transmitted,
wherein determining the transmission loss of the wireless signal based on the obstacle information comprising:
determining the transmission loss of the wireless signal corresponding to each material type of obstacles indicated by the obstacle material type information, according to a predetermined correspondence between the material types of the obstacle and the transmission losses of the wireless signal;
calculating a sum of products of the transmission loss of the wireless signal corresponding to each material type of the obstacles in each direction and the number of the corresponding obstacles in the direction as the transmission loss of the wireless signal in the direction; and
determining a maximum value of the one or more transmission losses of the wireless signal corresponding to the one or more directions as the transmission loss of the wireless signal.

13. The electronic device according to claim 10, wherein the computer executable instructions, when executed by the processor, further cause the processor to:
display, via the graphical user interface, the coverage range of the wireless signal, and/or
correct the transmit power Pt according to minimum and maximum values of the transmit power that can be set for the wireless signal transmitter.

14. The electronic device according to claim 10, wherein
in the case where there are multiple wireless signal transmitters, the electronic device is associated with a master wireless signal transmitter, and wherein the computer executable instructions, when executed by the processor, further cause the processor to:

set respective transmit power for the multiple wireless signal transmitters, wherein the respective transmit power of the multiple wireless signal transmitter is the same or different, and/or receive information indicating a position relation of the multiple wireless signal transmitters that is inputted via a graphical user interface, and display, via a graphical user interface, the coverage range of the wireless signal of each wireless signal transmitter.

15. A non-transitory computer readable medium having computer executable instructions stored thereon which, when executed by a processor, cause the processor to:

receive information indicating a coverage range of the wireless signal and obstacle information within the coverage range of the wireless signal which are inputted via a graphical user interface, wherein the obstacle information at least comprises obstacle material type information indicating a material type of an obstacle to be passed by the wireless signal transmission;

determine a transmission loss of the wireless signal based on the obstacle information;

set transmit power Pt of the wireless signal based on the information indicating the coverage range of the wireless signal and the determined transmission loss of the wireless signal; and causing a wireless signal transmitter transmitting the wireless signal with the set transmit power Pt.

16. The non-transitory computer readable medium according to claim 15, wherein determining the transmission loss of the wireless signal based on the obstacle information comprising: determining the transmission loss of the wireless signal corresponding to the material type indicated by the obstacle material type information, according to a predetermined correspondence between the material types of the obstacle and the transmission losses of the wireless signal.

17. The non-transitory computer readable medium according to claim 15, wherein the obstacle information further comprises a number of obstacles of each material type in each of one or more directions in which the wireless signal is to be transmitted, wherein determining the transmission loss of the wireless signal based on the obstacle information comprising:

determining the transmission loss of the wireless signal corresponding to each material type of obstacles indicated by the obstacle material type information, according to a predetermined correspondence between the material types of the obstacle and the transmission losses of the wireless signal;

calculating a sum of products of the transmission loss of the wireless signal corresponding to each material type of the obstacles in each direction and the number of the corresponding obstacles in the direction as the transmission loss of the wireless signal in the direction; and determining a maximum value of the one or more transmission losses of the wireless signal corresponding to the one or more directions as the transmission loss of the wireless signal.

18. The non-transitory computer readable medium according to claim 15, wherein the computer executable instructions, when executed by the processor, further cause the processor to:

display, via the graphical user interface, the coverage range of the wireless signal, and/or correct the transmit power Pt according to minimum and maximum values of the transmit power that can be set for the wireless signal transmitter.

19. The non-transitory computer readable medium according to claim 15, wherein in the case where there are multiple wireless signal transmitters, the computer executable instructions, when executed by the processor associated with a master wireless signal transmitter, cause the processor to:

set respective transmit power for the multiple wireless signal transmitters, wherein the respective transmit power of the multiple wireless signal transmitter is the same or different, and/or receive information indicating a position relation of the multiple wireless signal transmitters which is inputted via a graphical user interface, and display, via a graphical user interface, the coverage range of the wireless signal of each wireless signal transmitter.

20. An apparatus comprising units for performing the method according to claim 1.

* * * * *